United States Patent
Takagi et al.

(10) Patent No.: US 9,888,666 B2
(45) Date of Patent: Feb. 13, 2018

(54) ANIMAL LITTER BOX

(71) Applicant: UNICHARM CORPORATION, Ehime (JP)

(72) Inventors: Chiyo Takagi, Kanonji (JP); Shinya Kaneko, Kanonji (JP); Tomoko Hirao, Kanonji (JP); Nobuharu Namikawa, Toyama (JP)

(73) Assignee: UNICHARM CORPORATION, Ehime (JP)

( * ) Notice: Subject to any disclaimer, the term of this patent is extended or adjusted under 35 U.S.C. 154(b) by 129 days.

(21) Appl. No.: 14/895,611

(22) PCT Filed: May 27, 2014

(86) PCT No.: PCT/JP2014/064015
§ 371 (c)(1),
(2) Date: Dec. 3, 2015

(87) PCT Pub. No.: WO2014/196417
PCT Pub. Date: Dec. 11, 2014

(65) Prior Publication Data
US 2016/0135420 A1     May 19, 2016

(30) Foreign Application Priority Data

Jun. 6, 2013   (JP) .................................. 2013-120265
Sep. 24, 2013  (JP) .................................. 2013-197233

(51) Int. Cl.
*A01K 1/01*     (2006.01)
(52) U.S. Cl.
CPC .................. *A01K 1/0114* (2013.01)
(58) Field of Classification Search
CPC .............................. A01K 1/0107; A01K 1/0114
(Continued)

(56) References Cited

U.S. PATENT DOCUMENTS 4,696,257 A      9/1987  Neary et al.
5,598,810 A  *   2/1997  Lawton, III ......... A01K 1/0114
                                                   119/166
(Continued)

FOREIGN PATENT DOCUMENTS

CN     101686648 A      3/2010
JP     2-46693 Y2     12/1990
(Continued)

OTHER PUBLICATIONS

Office Action in CN Patent Application No. 201480031704.3 dated Feb. 28, 2017.
(Continued)

*Primary Examiner* — Yvonne Abbott-Lewis
(74) *Attorney, Agent, or Firm* — Hauptman Ham, LLP (57) ABSTRACT

Provided is a litter box for animals that is hygienic and easy to clean. A litter box for animals is provided with a lower container, the upper part of which is open and which has a lower bottom surface part and a lower side wall part standing up from the peripheral edge of the lower bottom surface part, and an upper container, the upper part of which is open and which is disposed above the lower container. The upper container is provided with a upper bottom surface part in which a plurality of through holes is formed, an upper wall part standing up from the peripheral edge of the upper bottom surface part, and an extending wall part that extends downward from the outer surface of the upper wall part. The lower end part of the extending wall part is disposed lower than the upper bottom surface part.

10 Claims, 12 Drawing Sheets

(58) Field of Classification Search
USPC .................................................. 119/166, 165
See application file for complete search history.

(56) References Cited

U.S. PATENT DOCUMENTS

| | | | | |
|---|---|---|---|---|
| 5,755,182 | A * | 5/1998 | Brown, Jr. ............ | A01K 1/0114 119/165 |
| 6,009,836 | A | 1/2000 | Neary et al. | |
| 6,701,868 | B1 * | 3/2004 | Shepherd ............. | A01K 1/0114 119/161 |
| 6,994,054 | B2 * | 2/2006 | Matsuo ................ | A01K 1/0114 119/166 |
| 7,055,460 | B2 * | 6/2006 | Sjogren ................ | A01K 1/0114 119/166 |
| 9,163,777 | B1 * | 10/2015 | Knecht .................. | F16M 11/24 |
| 2001/0009142 | A1 | 7/2001 | Otsuji et al. | |
| 2009/0000558 | A1 | 1/2009 | Matsuo et al. | |
| 2012/0204800 | A1 | 8/2012 | Beaudoin et al. | |
| 2013/0133585 | A1 * | 5/2013 | Hecht .................. | A01K 1/0114 119/166 |
| 2014/0150727 | A1 | 6/2014 | Matsuo et al. | |
| 2015/0048538 | A1 * | 2/2015 | Sogou ................... | A01K 1/0155 264/128 |
| 2015/0075439 | A1 * | 3/2015 | Sogou ................... | A01K 1/0107 119/166 |
| 2015/0327508 | A1 * | 11/2015 | Maddox ................ | A01K 1/011 119/166 |

FOREIGN PATENT DOCUMENTS

| | | |
|---|---|---|
| JP | 2002-45067 A | 2/2002 |
| JP | 2010-88361 A | 4/2010 |
| JP | 2013-17446 A | 1/2013 |
| WO | 01/76356 A1 | 10/2001 |
| WO | 2014/022903 A1 | 2/2014 |

OTHER PUBLICATIONS

International Search Report dated Sep. 2, 2014, corresponding to International Application No. PCT/JP2014/064015.
Extended European Search Report dated Apr. 15, 2016, corresponding to European Patent Application No. 14807404.0.

* cited by examiner

ANIMAL LITTER BOX

RELATED APPLICATIONS

The present application is a National Phase of International Application Number PCT/JP2014/064015, filed May 27, 2014, which claims priority to Japanese Application Numbers 2013-120265, filed Jun. 6, 2013, and 2013-197233, filed Sep. 24, 2013.

TECHNICAL FIELD

The present invention relates to an animal litter box.

BACKGROUND ART

Heretofore, as an animal litter box for disposing excreta from an animal such as a cat, an animal litter box, which is configured of a lower container and an upper container that is placed on the lower container, the upper container having liquid permeation holes on a bottom portion thereof, has been known. Such an animal litter box is used in a state in which a liquid absorbent member is placed on the lower container and a granular matter, so-called litter, is housed in the upper container (refer for example to Patent Document 1). According to the animal litter box disclosed in Patent Document 1, as the animal passes excreta on the granular matter, liquid such as urine passes through the granular matter and then the liquid permeation holes of the upper container, to be absorbed by the liquid absorbent member in the lower container.

Patent Document 1: Japanese Unexamined Patent Application Publication No. 2002-45067

DISCLOSURE OF THE INVENTION

Problems to be Solved by the Invention

In the animal litter box disclosed in Patent Document 1, a bottom face of the upper container is in direct contact with the liquid absorbent member placed in the lower container. It is therefore necessary to place the upper container, of which bottom face is covered with the excreta, on a floor or the like of a living space during cleaning of the animal litter box and changing of the liquid absorbent member.

When the upper container is placed directly on a floor or the like, the floor is contaminated with the excreta. In order to prevent the contamination, a user is required to lay a sheet such as newspaper, thus there could be a problem of increased number of steps for cleaning, and a problem of deteriorated hygiene.

An objective of the present invention is to provide an animal litter box allowing superior hygiene and easy cleaning.

Means for Solving the Problems (1) An animal litter box of the present invention includes: a lower container of which top portion is open, the lower container having a lower bottom portion and a lower side wall portion provided upright from a periphery of the lower bottom portion; and an upper container of which top portion is open, the upper container being placed on the lower container. The upper container includes: an upper bottom portion in which a plurality of through holes is formed; an upper wall portion provided upright from a periphery of the upper bottom portion; and an extension wall portion extending downwardly from an outer face of the upper wall portion. A lower end portion of the extension wall portion is positioned below the upper bottom portion.

(2) In a state in which the upper container is placed on the lower container, the extension wall portion is preferably arranged more to an outer side than the lower side wall portion.

(3) The extension wall portion preferably includes: a foot portion in contact with an installation surface on which the lower container is installed in a state in which the upper container is placed on the lower container; and a cutout portion provided to expose the lower side wall portion in a state in which the upper container is placed on the lower container.

(4) The lower container preferably further includes a grip portion arranged on an outer face of the lower side wall portion, and the cutout portion is arranged at a position corresponding to the grip portion.

(5) The cutout portion is preferably provided at least on faces of the extension wall portion that are arranged face-to-face.

(6) The lower container preferably has a shape with a plurality of corner portions in a plan view, and the foot portion is arranged at positions corresponding to the corner portion.

(7) The lower container preferably further includes a restriction portion that is provided in the vicinity of the corner portion and prevents the foot portion from entering to the inside of the lower container.

(8) The corner portion or the restriction portion preferably has a slit formed to extend downward from an upper end portion of the lower side wall portion.

The restriction portion preferably includes: a projecting portion that projects outward from the corner portion, and a hole portion that is formed below the projecting portion.

Effects of the Invention

The present invention can provide an animal litter box allowing superior hygiene and easy cleaning.

PREFERRED MODE FOR CARRYING OUT THE INVENTION

Preferred embodiments of the animal litter box according to the present invention are explained hereinafter with reference to the drawings. First, the animal litter box according to the first embodiment will be described with reference to FIGS. 1 to 6.

Figure 1:
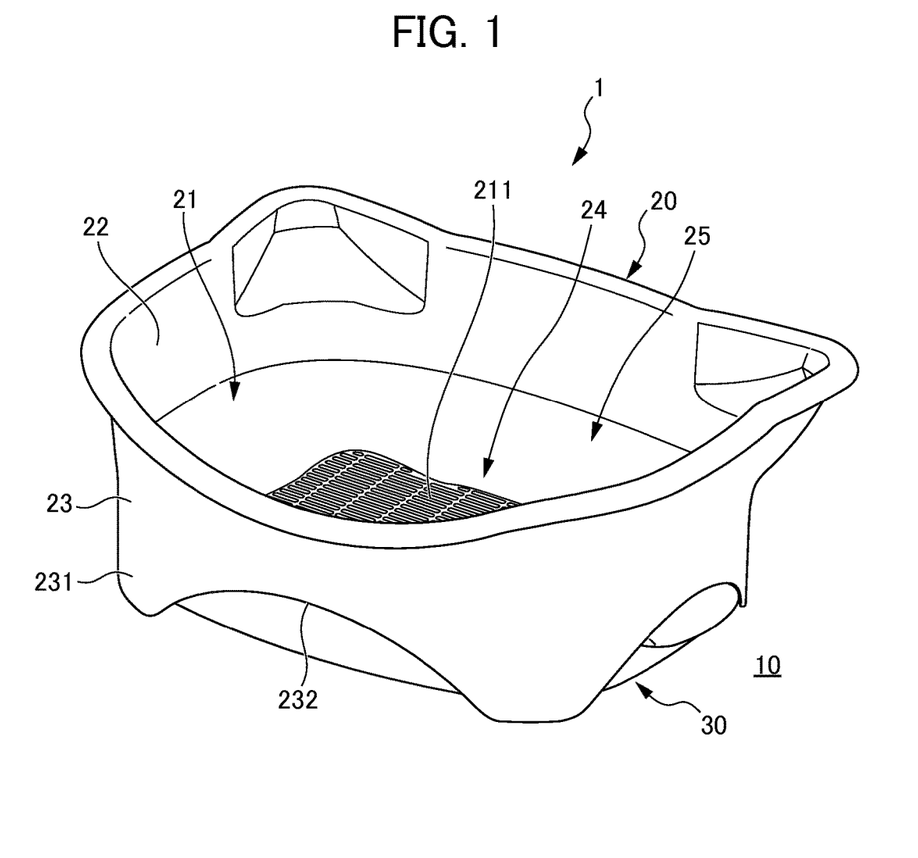
FIG. 1 is a perspective view illustrating an animal litter box according to a first embodiment.
Figure 2:
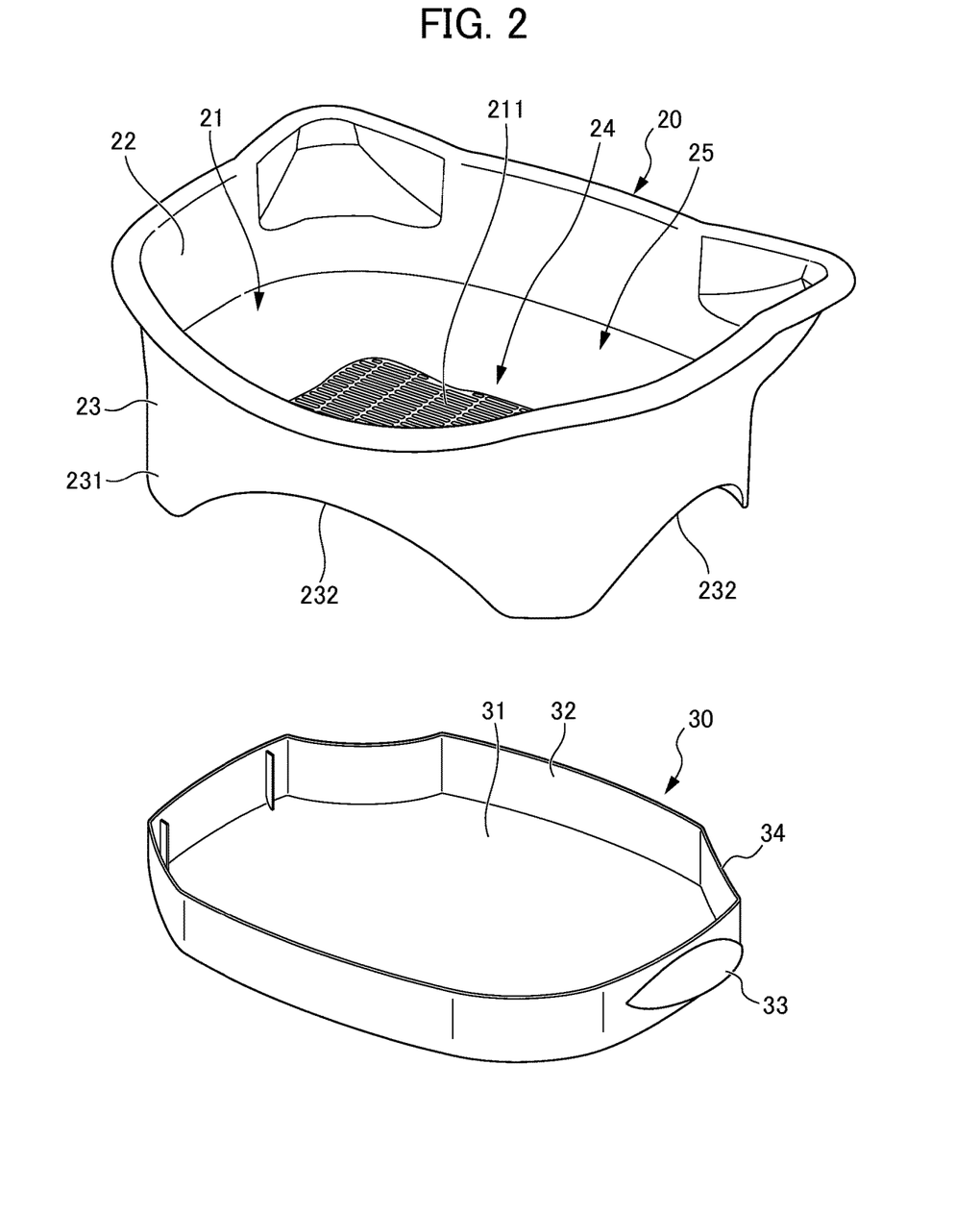
FIG. 2 is an exploded perspective view of the animal litter box according to the first embodiment.
Figure 3:
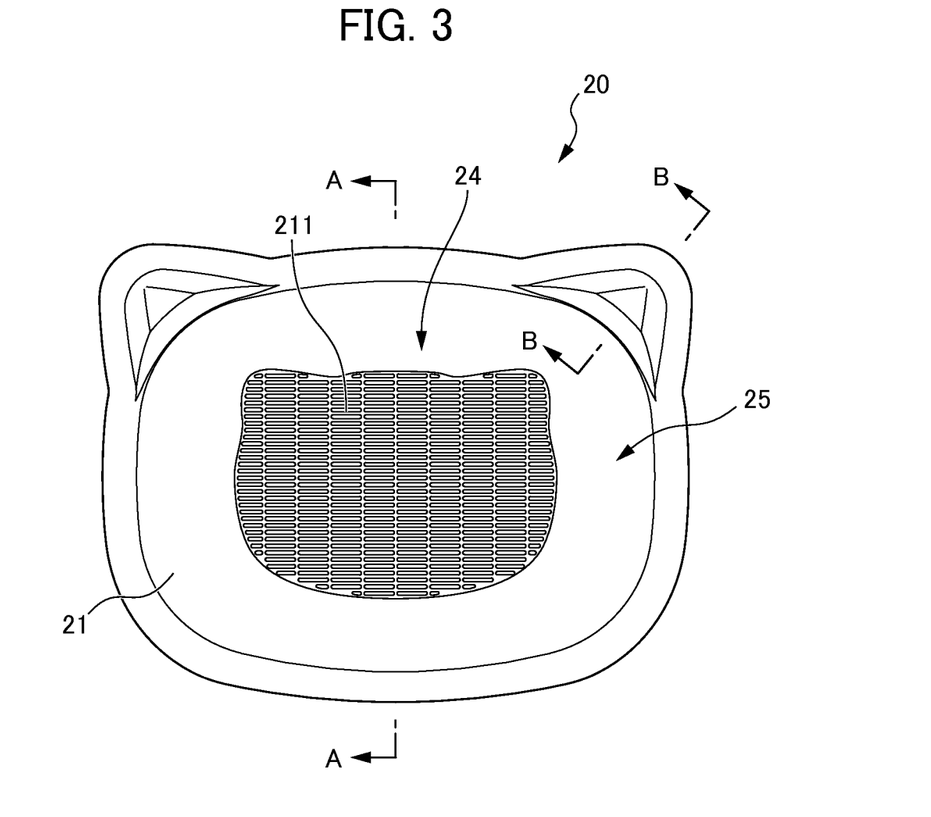
FIG. 3 is a front view of an upper container of the animal litter box according to the first embodiment.
Figure 4:
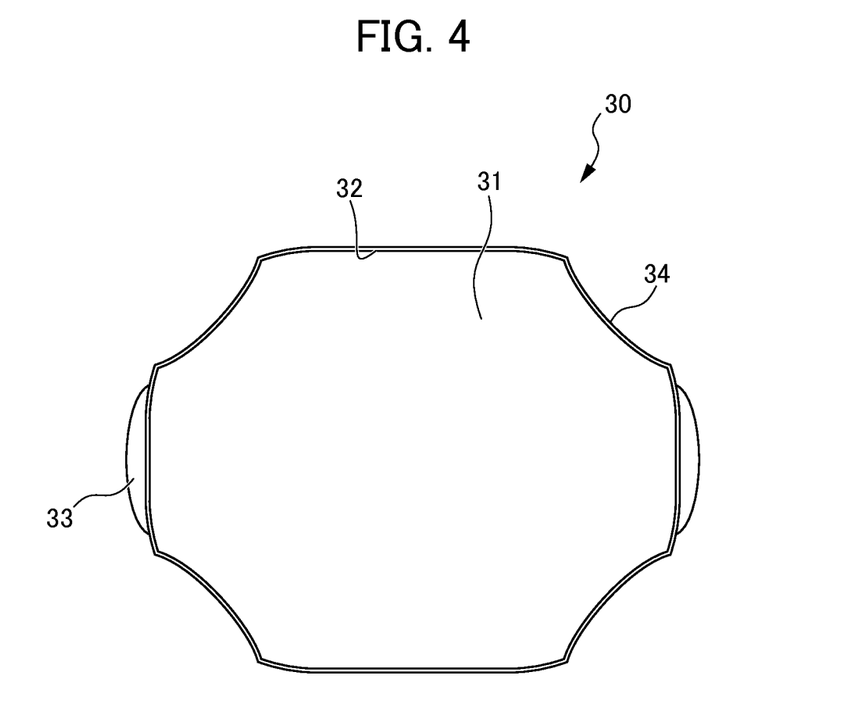
FIG. 4 is a front view of a lower container of the animal litter box according to the first embodiment.
Figure 5:
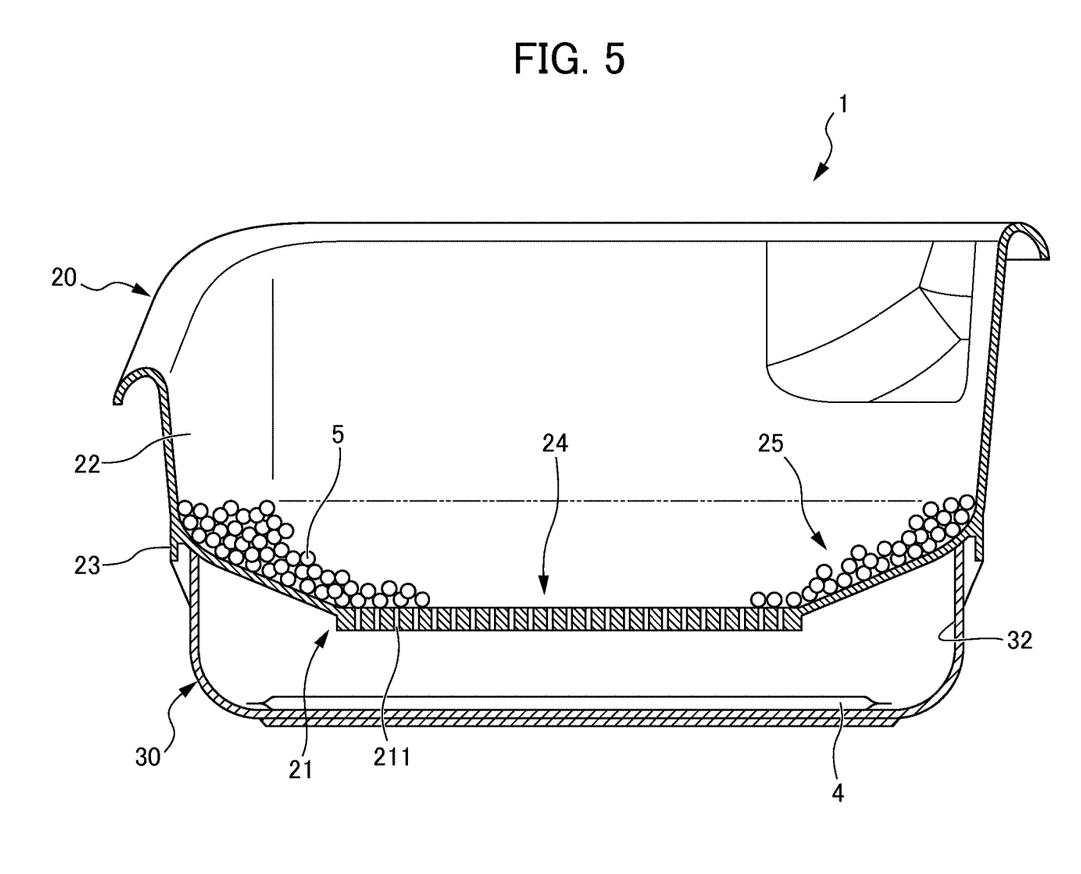
FIG. 5 is a cross-sectional view illustrating a usage state of the animal litter box of FIG. 3, taken along a line A-A.
Figure 6:
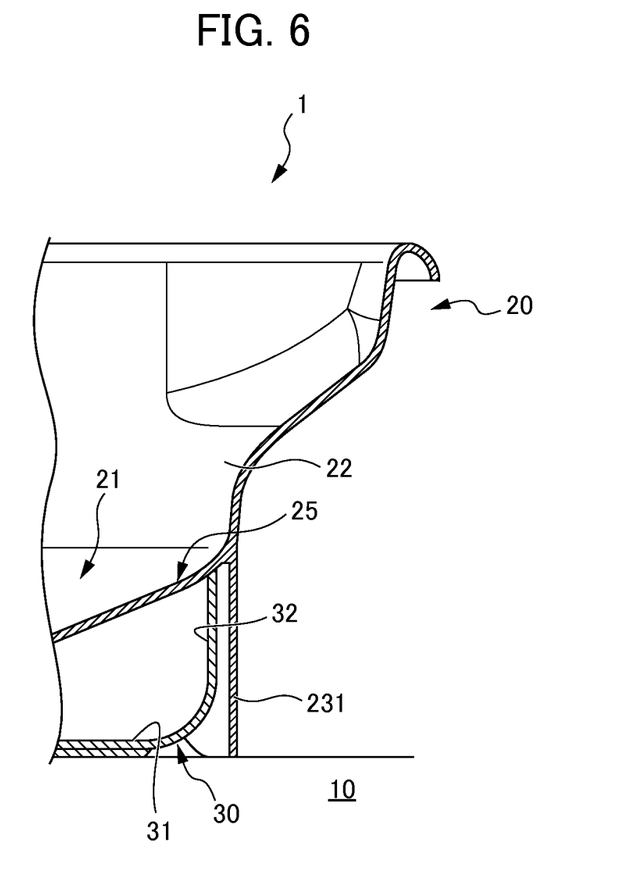
FIG. 6 is an enlarged cross-sectional view of the animal litter box of FIG. 3, taken along a line B-B.

FIG. 1 is a perspective view illustrating an animal litter box 1. FIG. 2 is an exploded perspective view of the animal litter box 1. FIG. 3 is a front view of an upper container 20 of the animal litter box 1. FIG. 4 is a front view of a lower container 30 of the animal litter box 1. FIG. 5 is a cross-sectional view taken along a line A-A of the animal litter box 1 illustrated in FIG. 3, illustrating a state in which a liquid absorbent member 4 and an excreta disposal material 5 are respectively housed. FIG. 6 is a cross-sectional view of the animal litter box 1 illustrated in FIG. 3, taken in a direction B.

The animal litter box 1 includes the lower container 30 and the upper container 20 as illustrated in FIG. 1. The animal litter box 1 is installed on an installation surface 10 such as a floor of a living space.

The lower container 30 includes a lower bottom portion 31, a lower side wall portion 32, a grip portion 33, and a corner portion 34 as illustrated in FIG. 2. The lower container 30 is a container of which top portion is open, as illustrated in FIG. 2.

As illustrated in FIG. 4, the lower bottom portion 31 has a substantially octagonal shape, in which a rectangular shape with four corners being cut off obliquely with respect to each long side and each short side, in a plan view.

The lower side wall portion 32 is a wall provided upright from a periphery of the lower bottom portion 31.

The grip portion 33 is arranged on an outer face of the lower side wall portion 32. The grip portion 33 is arranged at two positions face-to-face, one on each of short sides of the lower container 30. The grip portion 33 is provided to project outward from the lower container 30.

The corner portion 34 is configured of a side arranged obliquely to connect the long side and the short side, among 8 sides of the substantially octagonal shape of the lower container 30. In the present embodiment, the corner portion 34 is slightly curved to be convex toward the inside of the lower container 30.

The upper container 20 includes an upper bottom portion 21, a through hole(s) 211, an upper wall portion 22, and an extension wall portion 23 as illustrated in FIG. 2. The upper container 20 is placed on and above the lower container 30. The upper container 20 is a container of which top portion is open. As illustrated in FIG. 3, the upper container 20 has a rectangular shape with four round corners in a plan view, in which ends of one long side project outward.

The upper bottom portion 21 configures a bottom face of the upper container 20. The upper bottom portion 21 includes a planar portion 24 and a tapered portion 25, as illustrated in FIGS. 1 and 3.

The planar portion 24 is formed in a substantial center of the upper bottom portion 21 in a plan view, and is located at a lowermost position in a height direction of the upper bottom portion 21. The planar portion 24 is a face of the upper container 20 extending in a substantially horizontal direction. A plurality of through holes 211 is formed in the planar portion 24.

The tapered portion 25 is a face which is acclivitous from a periphery of the planar portion 24 toward a periphery of the upper bottom portion 21. A taper angle of the tapered portion 25 is preferably 5 to 60 degrees with respect to the upper bottom portion 21. If a taper angle of the tapered portion 25 is too shallow as to be smaller than 5 degrees, it makes difficult for urine and the like of an animal to flow toward the planar portion 24 and drain to the lower container 3. If a taper angle of the tapered portion 25 is too steep as to be greater than 60 degrees, it results in a decreasing of the size of a space that an animal can place its paws stably in the upper container 20. A taper angle within the above specified range is thus preferred.

As illustrated in FIG. 2, the upper wall portion 22 stands from the periphery of the upper bottom portion 21 and extends upward. The upper wall portion 22 extends to an upper end of the upper container 20 and warps outward at the upper end.

The extension wall portion 23 is formed to extend from an outer face of the upper wall portion 22 downward. The extension wall portion 23 is arranged such that a lower end portion thereof is positioned below the upper bottom portion 21. As illustrated in FIG. 5, in a state in which the upper container 20 is placed on the lower container 30, the extension wall portion 23 is arranged more to an outer side than the lower side wall portion 32.

The extension wall portion 23 has a foot 231 and a cutout portion 232.

In a state in which the upper container 20 is placed on the lower container 30, the foot 231 is in contact with the installation surface 10 of the animal litter box 1 as illustrated in FIG. 6. In the present embodiment, the number of the feet 231 is 4. The foot 231 is formed such that a lower end thereof is in contact with the installation surface 10 and the foot extends upward to support the upper container 20. The foot 231 is formed not according to the shape, which is convex inward, of the corner portions 34 of the lower container 30, but along a curve connecting the long side and the short side of the upper container 20. The foot 231 is arranged at a position corresponding to the corner portion 34, on an outer side of the corner portion 34.

The cutout portion 232 is formed by cutting out a lower end side edge of the extension wall portion 23 so as to sweep upward. The outer face of the lower side wall portion 32 is exposed through the cutout portion 232. The cutout portion 232 is provided in a symmetrical manner on faces of the extension wall portion 23 that are arranged face-to-face.

The above described grip portion 33 on the lower container 30 is provided at a position corresponding to a position on the upper container 20 at which the cutout portion 232 is formed. As a result, as illustrated in FIG. 1, the grip portion 33 projects outward from a longitudinal end of the upper container 20, in a state in which the lower container 30 is arranged below the upper container 20.

The animal litter box 1 described thus far is used in a state in which the liquid absorbent member 4 is placed in the lower container 30 and the granular excreta disposal material 5 is housed in the upper container 20.

The liquid absorbent member 4 is, as illustrated in FIG. 5, a member that can absorb excreta, such as urine, from an animal. The liquid absorbent member 4 is a rectangular sheet in which a liquid permeable top sheet, a liquid retainable intermediate sheet, and a liquid impermeable back sheet are layered and joined.

The excreta disposal material 5 is a granular disposal material so-called litter, that absorbs excreta such as urine from an animal and make the excreta passed through. Granular matters of various materials, including one that is hydrophobic and lets through a large quantity of liquid to the liquid absorbent member and one that solidifies as it absorbs liquid such as urine, are used appropriately as the litter.

A usage state of the animal litter box 1 is described hereinafter.

Figure 7:
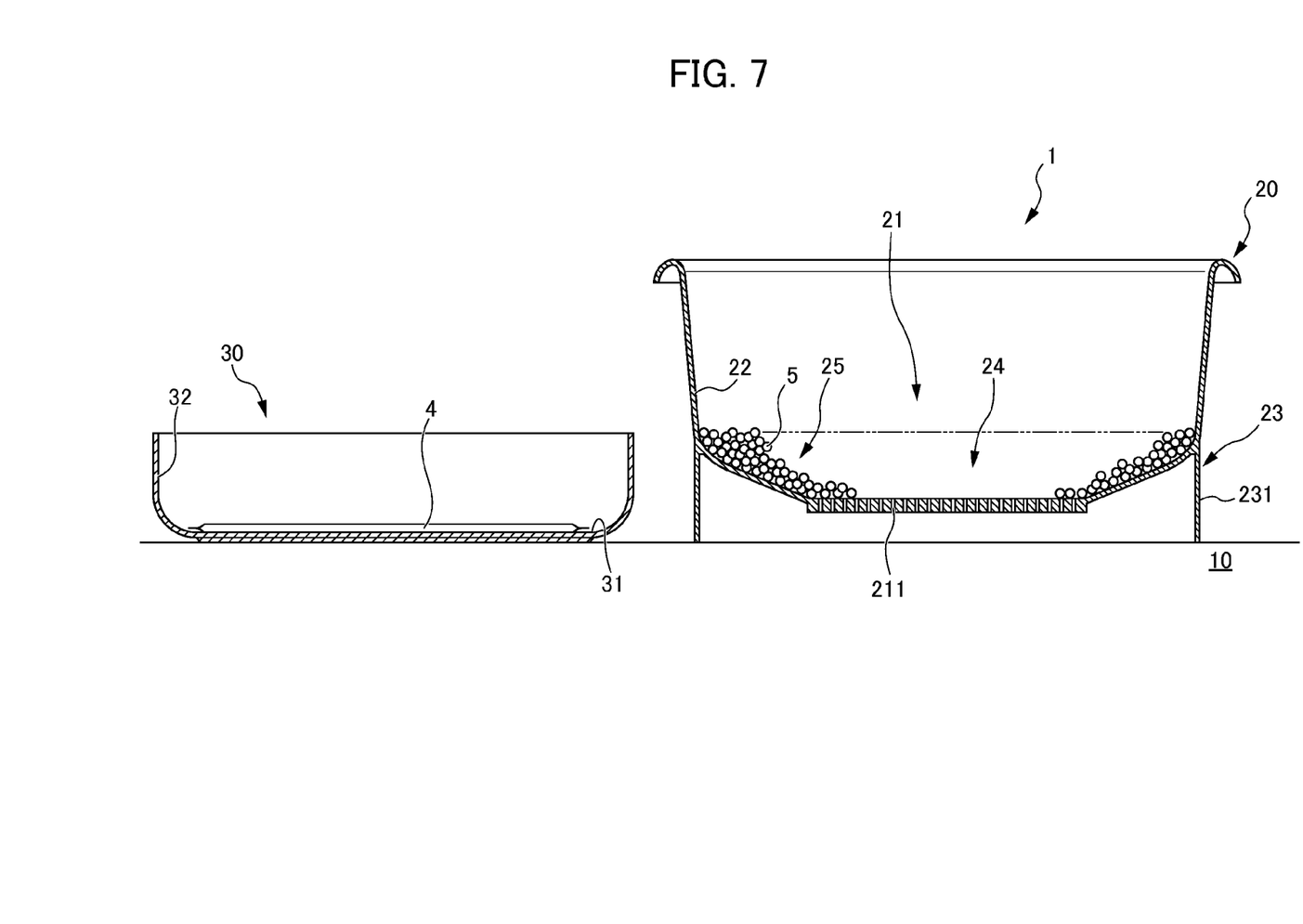
FIG. 7 is a diagram illustrating a usage state of the animal litter box according to the first embodiment.

FIG. 7 is a schematic view illustrating a usage state of the animal litter box 1.

As illustrated in FIG. 5, an animal such as a cat enters into the animal litter box 1 and urinates on the excreta disposal material 5 housed in the upper container 20. Liquid excreta such as urine passes through the excreta disposal material 5 and then the through holes 211 on the upper bottom portion 21, and is absorbed by the liquid absorbent sheet placed in the lower container 30. As illustrated in FIG. 6, the foot 231 that extends from the upper wall portion 22 toward a lower outer side of the lower side wall portion 32, and is in contact with the installation surface 10 of the lower container 30 is provided on the upper container 20. The foot 231 is not in contact with the lower bottom portion 31, on which the liquid absorbent member 4 having absorbed excreta is placed. A bottom face of the foot 231 is thus not contaminated. As a result, cleaning is possible in a state in which the upper container 20 is removed from the lower container 30 and placed directly on a floor or the like, as illustrated in FIG. 7.

When the animal litter box 1 is to be carried around before and after cleaning, the lower container 30 and the upper container 20 can be carried together by gripping the grip portion 33 that projects from the cutout portion 232 of the upper container 20.

The animal litter box 1 according to the present embodiment described thus far provides the following effects.

(1) In the animal litter box 1 provided with the upper container 20 and the lower container 30 arranged below the upper container: the upper container 20 is provided with the upper bottom portion 21 in which the plurality of through holes 211 are formed, the upper wall portion 22 that is provided upright from the periphery of the upper bottom portion 21, and the extension wall portion 23 that extends downward from the outer face of the upper wall portion 22; and a lower end of the extension wall portion 23 is positioned below the upper wall portion 21. Since the lower end of the extension wall portion 23 is positioned below the upper wall portion 21, when the upper container 20 is placed on the lower container 30, a space is provided between the upper bottom portion 21 and the lower container 30, thereby preventing the upper bottom portion 21 from contact with the liquid absorbent member 4 and the like housed in the lower container 30. In addition, since the lower end of the extension wall portion 23 is positioned below the upper wall portion 21, even when the upper container 20 is removed from the lower container 30, the upper bottom portion 21 is not brought into direct contact with a floor or the like, thereby allowing hygienic cleaning of the animal litter box.

(2) The extension wall portion 23 is arranged more to the outer side than the lower side wall portion 32. Since the extension wall portion 23 is arranged more to the outer side than the lower side wall portion 32, a lower end of the extension wall portion 23 is not in contact with the lower bottom portion 31. The lower end of the extension wall portion 23 is thus not in contact with, and contaminated by, the liquid absorbent member 4. As a result, cleaning of the animal litter box 1 is possible without contaminating a floor, even if the upper container 20 is removed and placed on a floor or the like.

(3) The extension wall portion 23 is provided with: the foot portion 231 in contact with an installation surface of the lower container 30 in a state in which the upper container 20 is placed on the lower container 30; and the cutout portion 232 provided to expose the lower side wall portion 32 in a state in which the upper container 20 is placed on the lower container 30. This allows the lower container 30 to be visually recognized in a state of being placed below the upper container 20, and makes it easier to place the upper container 20.

(4) The lower container 30 is provided with the grip portion 33 arranged on an outer face of the lower side wall portion 32, the cutout portion 232 being arranged at a position corresponding to the grip portion 33. The grip portion 33 projects outward through the cutout portion 232. As a result, the upper container 20 can be carried with the lower container 30 by gripping the grip portion 33.

(5) The cutout portion 232 is provided at least on faces of the extension wall portion 23 that are arranged face-to-face. This makes the cutout portions 232 and the feet 231 symmetrical and allows stable placement of the upper container 20.

(6) The lower container 30 is configured in a shape with the plurality of corner portions 34 in a plan view, and the foot portion 231 is arranged at positions corresponding to the corner portions 34. This shape makes the lower container 30 easier to be placed inside of the upper container 20, thereby reducing the overall size of the animal litter box 1. In addition, the foot portion 231 is provided to correspond to the corner portion 34 while avoiding the corner portion 34. As a result, when a user is placing the upper container 20 onto the lower container 30 in a posture of looking down the upper container 20, the foot portion 231 can be prevented from entering into the lower container 30 or from being placed at a wrong position.

Figure 8:
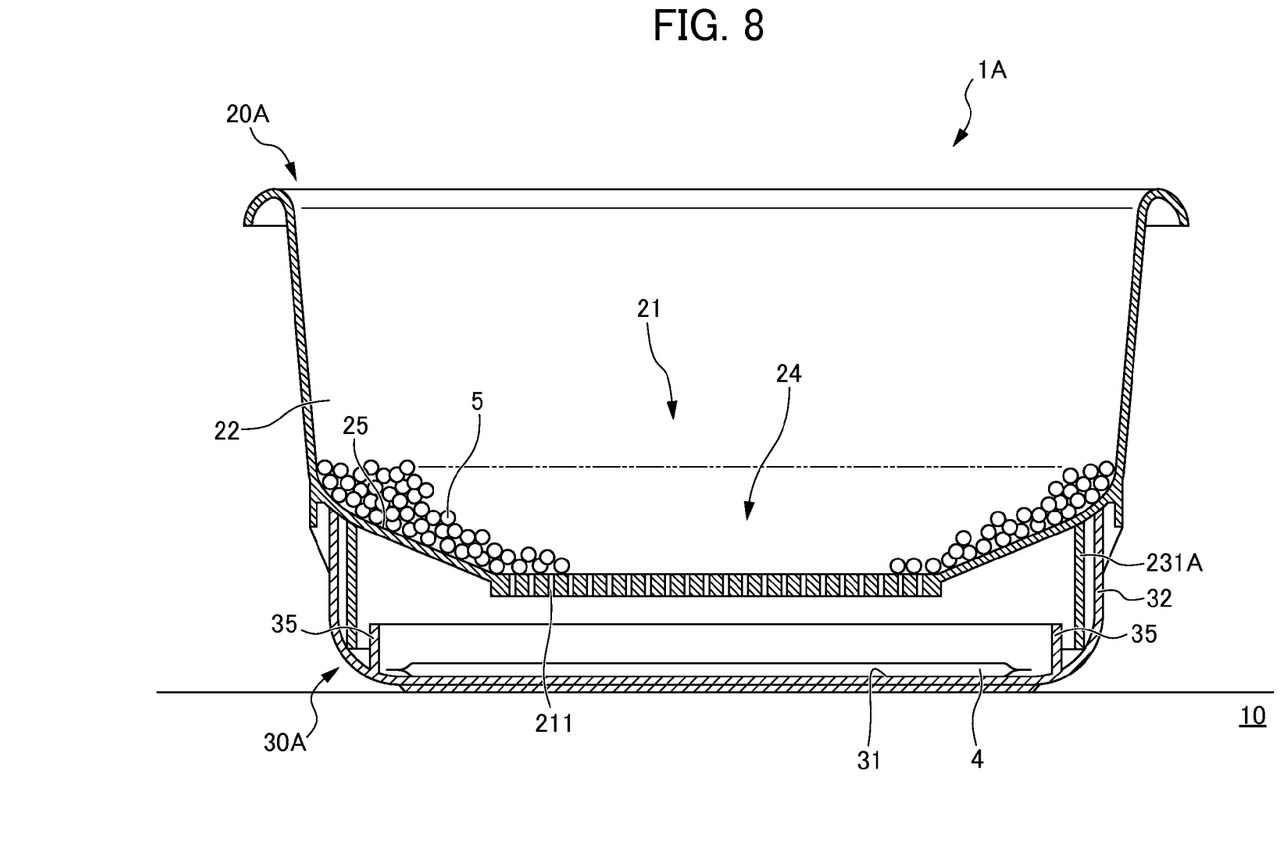
FIG. 8 is a schematic view of an animal litter box according to the second embodiment.

The animal litter box 1A according to the second embodiment is described hereinafter with reference to FIG. 8. FIG. 8 is a schematic view of the animal litter box 1A according to the second embodiment. Aspects similar to those of the animal litter box 1 will not be described for the animal litter box 1A.

The animal litter box 1A is different from the first embodiment in that the foot 231A of the upper container 20A is arranged inside of the lower side wall portion 32 of the lower container 30A. In other words, the lower container 30A of the second embodiment has a divider 35 that divides a peripheral side from an inner side of the lower bottom portion 31.

The divider 35 is provided upright from the lower bottom portion 31, to be lower than the lower side wall portion 32. The divider 35 is provided on the lower bottom portion 31, more to the inside than the lower side wall portion 32, along the lower side wall portion 32.

In the animal litter box 1A of the second embodiment, the foot 231A of the upper container 20A is arranged between the divider 35 and the lower side wall portion 32. Since the foot 231A is separated by the divider 35 from the inside of the lower bottom portion 31, liquid such as urine absorbed by the liquid absorbent member 4 placed inside the divider 35 will not be in contact with the foot portion 231A. The foot 231A is thus not contaminated with excreta, and the upper container 20A can be placed directly on the installation surface such as a floor of a living space. The animal litter box 1A of the second embodiment thus provides a similar effect to that of the first embodiment.

The preferred embodiments of the present invention have been described; however, the present invention is not limited thereto and can be modified accordingly.

For example, the lower container 30 is shaped to have a substantially octagonal shape in the first embodiment; however, the shape of the lower container 30 is not limited to a substantially octagonal shape.

FIGS. 9A to 9D illustrate the lower containers 30B and 30C according to modifications of the present invention.

Figure 9A:
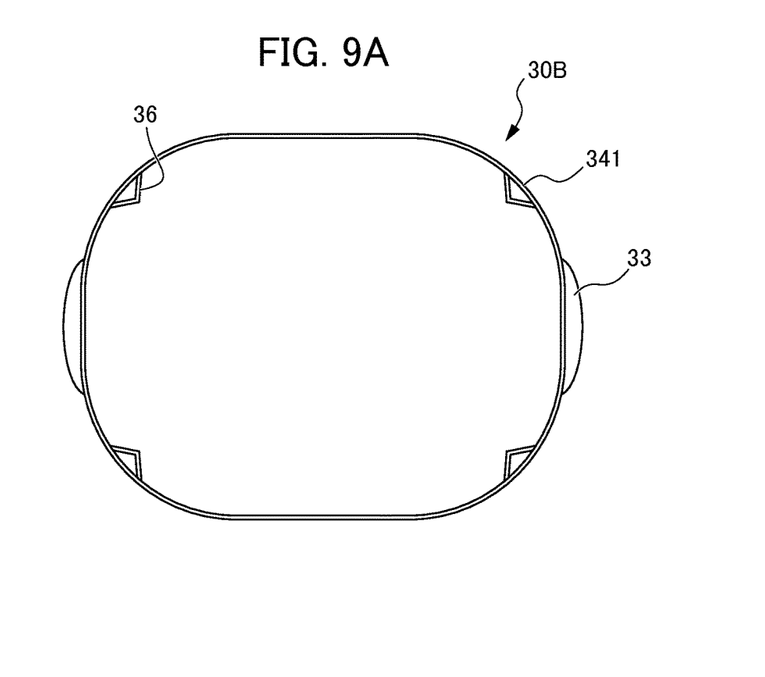
FIG. 9A is a schematic view illustrating a modification of the lower container according to the present invention.

As illustrated in FIG. 9A, the lower container 30B can also be configured in a substantially rectangular shape with a rounded corner portion 341 at four corners of the rectangular shape. The corner portion 341 is provided at positions corresponding to feet of the upper container and is chamfered to have a trajectory more to the inside than a corner of the rectangular shape. As a result, when a user places the upper container onto the lower container 30B while assuming a posture of looking down upon the upper container, the foot portion can be prevented from unintentionally entering into the lower container 30B.

In this case, a protrusion 36, which is dogleg shaped in a plan view and projects toward the inside of the lower container 30B, can further be provided as a restriction portion inside the corner portion 341. By providing the protrusion 36 inside the corner portion 341, the foot portion of the upper container can be prevented infallibly from entering the lower container 30B.

Figure 9B:
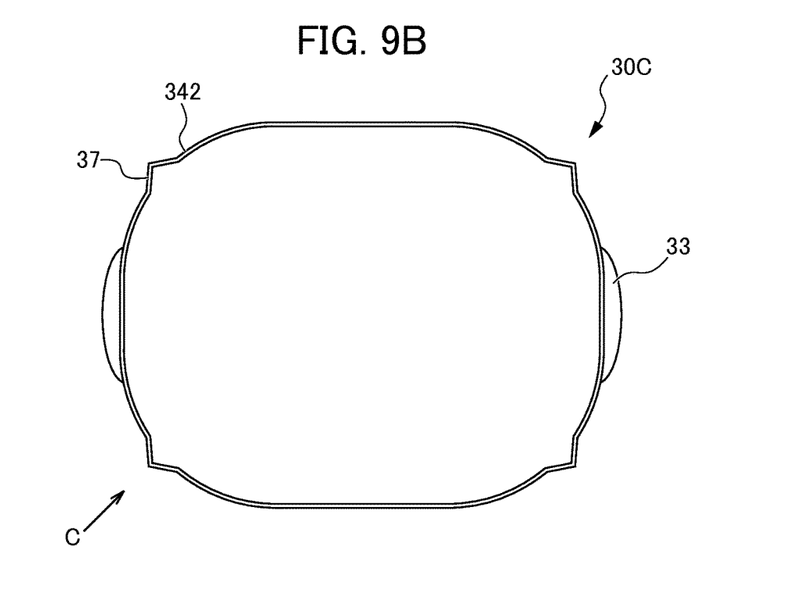
FIG. 9B is a schematic view illustrating a modification of the lower container according to the present invention.

Alternatively, as illustrated in FIG. 9B, the lower container 30C can also be configured in a substantially rectangular shape with a rounded corner portion 342 at four corners of the rectangular shape.

In this case, a projecting portion 37, which is dogleg shaped and projects outward from the corner portion 342 can further be provided as a restriction portion. The projecting portion 37 is formed on an outer face of the lower container at the corner portion 342, along a height direction. As in the case of providing the protrusion 36, by forming the projecting portion 37 on an outer side of the corner portion 342, when a user places the upper container onto the lower container 30C while assuming a posture of looking down upon the upper container, the foot portion can be prevented from unintentionally entering into the lower container 30C. In addition, in a case in which the liquid absorbent member 4 to be placed in the lower container 30C is rectangular, four corner s of the liquid absorbent member can be placed in the projecting portions 37.

Figure 9C:
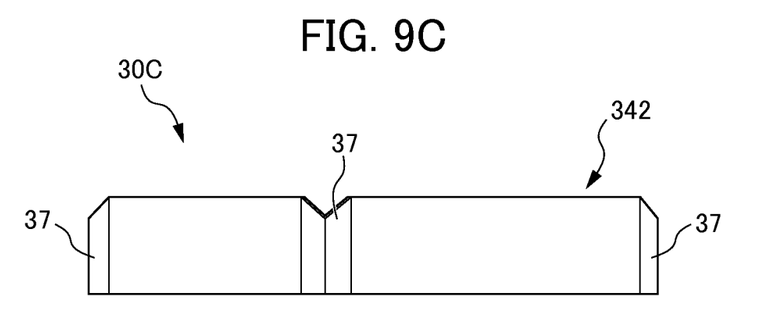
FIG. 9C is a view of the lower container illustrated in FIG. 9B, taken from a direction of arrow C.

FIG. 9C is a view of the lower container 30C illustrated in FIG. 9B, viewed from a direction of arrow C. An upper end of the projecting portion 37 is declivitous in a side view.

Since the upper end of the projecting portion 37 is declivitous, a part of the upper container in contact with the lower container 30C can be guided outward along a slope, without entering the lower container 30C.

Figure 9D:
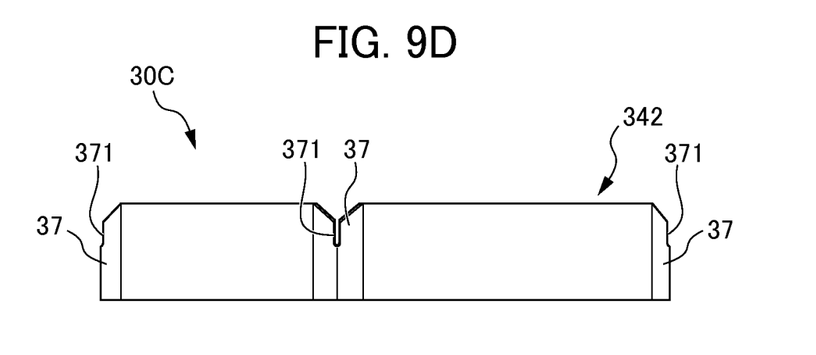
FIG. 9D is a view of a further modification of the lower container illustrated in FIG. 9B, taken from a direction of arrow C.

FIG. 9D is a further modification of the lower container illustrated in FIG. 9C. The projecting portion 37 may have a slit 371 formed at a corner of a dogleg shape in a plan view, so as to extend downward from an upper end portion of the lower side wall portion 32. In a case in which the liquid absorbent member 4 to be placed in the lower container 30C is rectangular, four corners of the liquid absorbent member can be inserted into and fixed at the slit 371, thereby preventing the liquid absorbent member 4 from wrinkling up and being turned over.

It should be noted that, not only in a case of providing the projecting portion in the lower container 30C, the slit 371 can also be formed downward from the upper end of the corner portion 34 without the projecting portion 37, as in FIG. 4. In this case, the slit 371 is preferably positioned in a substantial center in a width direction of each of the corner portions 34.

Figure 10A:
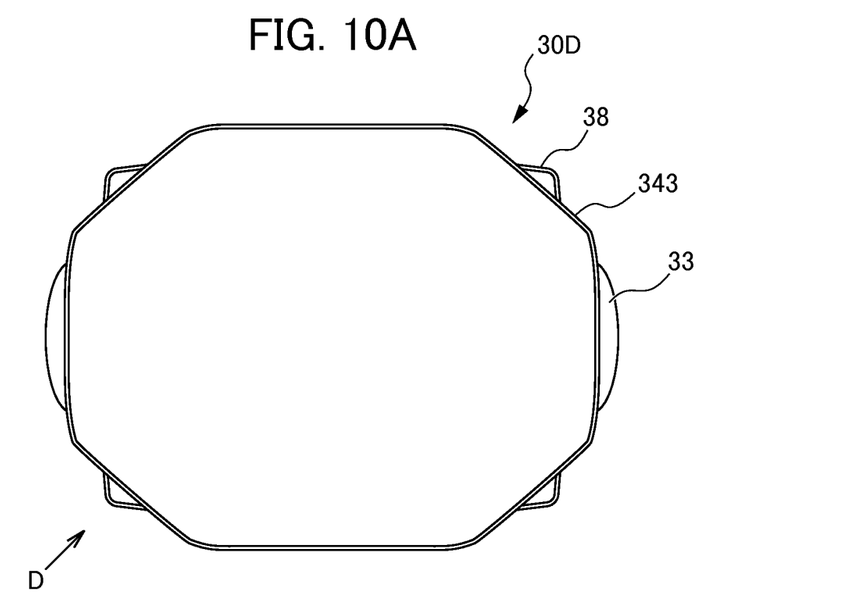
FIG. 10A is a schematic view illustrating a modification of the lower container according to the present invention.
Figure 10B:
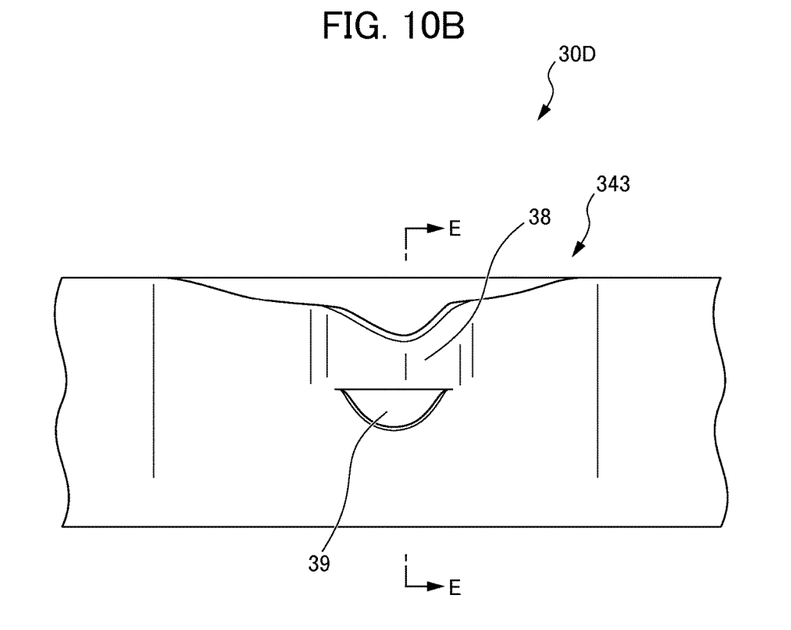
FIG. 10B is a view of the lower container illustrated in FIG. 10A, taken from a direction of arrow D.
Figure 10C:
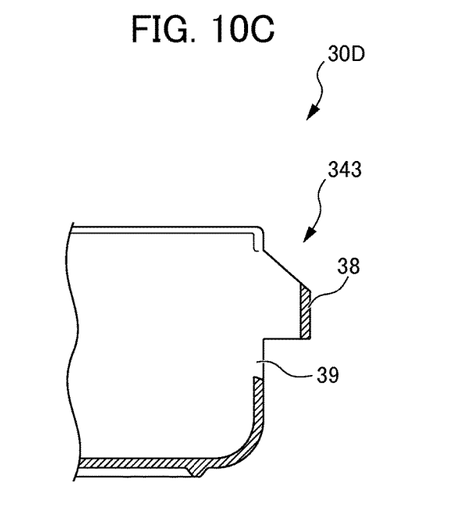
FIG. 10C is a cross-sectional schematic view of the lower container illustrated in FIG. 10B, taken along a line E-E.

FIGS. 10A to 10C illustrate the lower container 30D of the animal litter box according to another modification of the present invention. FIG. 10B is a view of the lower container 30D illustrated in FIG. 10A, viewed from a direction D. FIG. 10C is a cross-sectional schematic view taken along a line E-E shown in FIG. 10B.

As illustrated in FIG. 10A, the lower container 30D can also be configured in a substantially rectangular shape with a flat chamfered corner portion 343 at 4 corners of the rectangular shape. The corner portion 343 according to the another modification provides a similar effect to that of the corner portions 341, 342 according to the modification.

In this case, a projecting portion 38, which is dogleg shaped in a plan view and projects from the planar corner portion 343 toward the outside of the lower container 30D, can further be provided as a restriction portion, on an upper side in a height direction.

As illustrated in FIG. 10B, a through hole 39, as the hole portion, can be formed below the projecting portion 38. As illustrated in FIG. 10A, the lower container 30D is formed to have a substantially octagonal shape. As a result, if the liquid absorbent member 4 to be housed in the lower container 30D is rectangular, 4 corners of the liquid absorbent member 4 may interfere with an inner surface of the corner portion 343. In this case, by pulling out the 4 corners of the liquid absorbent member 4 from the through holes 39, the liquid absorbent member 4 can be prevented from wrinkling up and being turned over.

Furthermore, the projecting portion 38 according to the another modification can be declivitous in a side view, similarly to the projecting portion 37 illustrated in FIG. 9C. The declivity of the projecting portion 38 can provide a similar effect to that of the projecting portion 37 according to the above described modification.

The grip portion 33 projects outward from the lower container 30 in the first embodiment; however, the grip portion is not required to project. For example by providing a pair of grip holes (not illustrated), into which fingers can be inserted, on the lower side wall portion 32, the upper container placed on the lower container can be carried by lifting the lower container with fingers inserted into the grip holes.

In addition, the foot portion 231 is formed at 4 positions in the first and second embodiments; however, the number of the foot portions 231 is not limited to 4. For example, the extension wall portion of the upper container can be configured to extend along a periphery of the upper container and a cutout portion can be provided only in a part of a front portion.

EXPLANATION OF REFERENCE NUMERALS

1 Animal litter box
10 Installation surface
20, 20A Upper container
21 Upper bottom portion
211 Through hole
22 Upper wall portion
23 Extension wall portion
231, 231A Foot portion 232 Cutout portion
30, 30A, 30B, 30C, 30D Lower container
31 Lower bottom portion
32 Lower side wall portion
33 Grip portion
34 Corner portion
36 Protrusion (Restriction portion)
37 Projecting portion (Restriction portion)
371 Slit
38 Projecting portion (Restriction portion)
39 Through hole (Hole portion)

The invention claimed is:

1. An animal litter box, comprising:
a lower container of which a top portion is open, the lower container having a lower bottom portion and a lower side wall portion provided upright from a periphery of the lower bottom portion; and
an upper container of which a top portion is open, the upper container being placed on the lower container, wherein
the upper container includes:
   an upper bottom portion in which a plurality of through holes is formed;
   an upper wall portion provided upright from a periphery of the upper bottom portion; and
   an extension wall portion extending downwardly from an outer face of the upper wall portion,
the extension wall portion includes:
   a foot portion in contact with an installation surface on which the lower container is installed in a state in which the upper container is placed on the lower container;
   a cutout portion provided to expose the lower side wall portion in the state in which the upper container is placed on the lower container; and
   a lower end portion positioned below the upper bottom portion,
the lower container further includes a grip portion arranged on an outer face of the lower side wall portion, and
the cutout portion is arranged at a position corresponding to the grip portion.

2. The animal litter box according to claim 1, wherein in the state in which the upper container is placed on the lower container, the extension wall portion is outside of the lower side wall portion.

3. The animal litter box according to claim 1, wherein the cutout portion is provided at least on faces of the extension wall portion that are arranged face-to-face.

4. The animal litter box according to claim 1, wherein the lower container has a shape with a plurality of corner portions in a plan view, and
the foot portion has a plurality of foot portions arranged at positions corresponding to the plurality of corner portions.

5. The animal litter box according to claim 4, wherein the lower container further includes a restriction portion that is provided in the vicinity of one of the corner portions and prevents the foot portion from entering to the inside of the lower container.

6. The animal litter box according to claim 5, wherein the restriction portion includes:
   a projecting portion that projects outward from the corner portion, and
   a hole portion that is formed below the projecting portion.

7. The animal litter box according to claim 5, wherein the restriction portion has a slit formed to extend downward from an upper end portion of the lower side wall portion.

8. The animal litter box according to claim 4, wherein each of the corner portions has a slit formed to extend downward from an upper end portion of the lower side wall portion.

9. An animal litter box, comprising:
a lower container of which a top portion is open, the lower container having a lower bottom portion and a lower side wall portion provided upright from a periphery of the lower bottom portion; and
an upper container of which a top portion is open, the upper container being placed on the lower container, wherein
the upper container includes:
   an upper bottom portion in which a plurality of through holes is formed;
   an upper wall portion provided upright from a periphery of the upper bottom portion; and
   an extension wall portion extending downwardly from an outer face of the upper wall portion,
the extension wall portion includes:
   a foot portion in contact with an installation surface on which the lower container is installed in a state in which the upper container is placed on the lower container;
   a cutout portion provided to expose the lower side wall portion in the state in which the upper container is placed on the lower container; and
   a lower end portion positioned below the upper bottom portion, and
the lower container has a shape with a plurality of corner portions in a plan view,
the foot portion includes a plurality of foot portions arranged at positions corresponding to the corner portions, and
the lower container further includes a restriction portion that is provided in the vicinity of one of the corner portions and prevents the foot portion from entering to the inside of the lower container.

10. An animal litter box, comprising:
a lower container of which a top portion is open, the lower container having a lower bottom portion and a lower side wall portion provided upright from a periphery of the lower bottom portion; and
an upper container of which a top portion is open, the upper container being placed on the lower container, wherein
the upper container includes:
   an upper bottom portion in which a plurality of through holes is formed;
   an upper wall portion provided upright from a periphery of the upper bottom portion; and
   an extension wall portion extending downwardly from an outer face of the upper wall portion,
the extension wall portion includes:
   a foot portion in contact with an installation surface on which the lower container is installed in a state in which the upper container is placed on the lower container;
   a cutout portion provided to expose the lower side wall portion in the state in which the upper container is placed on the lower container; and
   a lower end portion positioned below the upper bottom portion, and the lower container has a shape with a plurality of corner portions in a plan view, the foot portion includes a plurality of foot portions arranged at positions corresponding to the corner portions, and each of the corner portions has a slit formed to extend downward from an upper end portion of the lower side wall portion.

\* \* \* \* \*